(12) United States Patent
Sukhadia et al.

(10) Patent No.: US 6,248,840 B1
(45) Date of Patent: Jun. 19, 2001

(54) PROCESS TO PRODUCE A COMPOSITION

(75) Inventors: Ashish M. Sukhadia; M. Bruce Welch; William M. Whitte; Syriac J. Palackal; William R. Coutant, all of Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/221,422

(22) Filed: Dec. 28, 1998

(51) Int. Cl.⁷ ....................................................... C08F 8/00

(52) U.S. Cl. .......................................................... 525/333.8

(58) Field of Search .................................. 525/333.8, 387

(56) References Cited

U.S. PATENT DOCUMENTS

| | | | |
|---|---|---|---|
| 4,460,750 | | 7/1984 | Thiersault et al. ................. 525/333.8 |
| 4,578,431 | | 3/1986 | Shaw et al. ........................... 525/387 |
| 4,614,764 | | 9/1986 | Colombo et al. ....................... 525/72 |
| 5,246,783 | * | 9/1993 | Spenadel et al. ..................... 428/461 |
| 5,405,917 | | 4/1995 | Mueller, Jr. et al. .............. 525/333.8 |
| 5,420,220 | | 5/1995 | Cheruvu et al. .................. 526/348.1 |
| 5,962,592 | * | 10/1999 | Hess et al. ........................... 525/232 |

* cited by examiner

Primary Examiner—Bernard Lipman
(74) Attorney, Agent, or Firm—Edward L. Bowman

(57) ABSTRACT

A process comprising reacting at least one polymer component, with at least one reactive component, to produce a composition, the polymer being a metallocene polymerized ethylene (co)polymer, and the reactive component being a crosslinking agent.

14 Claims, No Drawings

PROCESS TO PRODUCE A COMPOSITION

FIELD OF THE INVENTION

This invention is related to the field of polymers, wherein said polymers comprise polymerized ethylene.

BACKGROUND OF THE INVENTION

The process of making polymers and the process of using polymers is a multi-billion dollar business. This business produces and uses billions of pounds of polymers each year. Millions of dollars have been spent on developing technologies that can add value to this business. This is because of the large scale economics that are involved. That is, even small improvements in these processes can add millions of dollars to the bottom line. Consequently, research is on-going to find new and useful ways to produce these polymers and new and useful ways to use these polymers.

It is known in the art that increasing the long chain branching level (e.g. via crosslinking) of a polymer, where said polymer comprises polymerized ethylene, results in an increase in the haze of films obtained from blown film. Additionally, it is known that crosslinking such polymers substantially decreases their use in film applications because such crosslinking substantially decreases the dart impact, TD tear resistance, and gloss, of the film.

SUMMARY OF THE INVENTION

It is an object of this invention to provide a process to produce a composition.

It is another object of this invention to provide said composition.

In accordance with this invention a process to produce a composition is provided. This process comprises (or optionally, "consist essentially of", or "consists of") reacting: (a) at least one polymer component; with (b) at least one reactive component; to produce a composition.:

In accordance with this invention a composition is provided. Said composition comprises (or optionally, "consist essentially of", or "consists of") said composition produced by said process.

These objects and other objects will become more apparent from the following.

The terms "comprise", "comprises" and "comprising" are open-ended and do not exclude the presence of other steps, elememts, or materials that are not specifically mentioned in this specification.

The phrases "consists of" and "consisting of" are closed ended and do exclude the presence of other steps, elements, or materials that are not specifically mentioned in this specification, however, they do not exclude impurities normally associated with the elements and materials used.

The phrases "consists essentially of" and "consisting essentially of" do not exclude the presence of other steps, elements, or materials that are not specifically mentioned in this specification, as along as such steps, elements, or materials, do not affect the basic and novel characteristics of the invention, additionally, they do not exclude impurities normally associated with the elements and materials used.

The above terms and phrases are intended for use in areas outside of U.S. jurisdiction. Within the U.S. jurisdiction the above terms and phrases are to be applied as they are construed by U.S. courts and the U.S. Patent Office.

DETAILED DESCRIPTION OF THE INVENTION

The polymer component comprises a polymer. This polymer comprises polymerized monomers. These monomers are selected from the group consisting of ethylene and one or more alpha-olefins.

The alpha-olefins useful in this invention have from 3 to 12 carbon atoms. However, it is preferred when such alpha-olefins have from 3 to 10 carbon atoms, and it is most preferred when such alpha-olefins have from 4 to 8 carbon atoms. Suitable examples of such alpha-olefins are propene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, and 1-decene. Mixtures of alpha-olefins can be used in this invention.

The polymer needs to be produced by a metallocene catalyst. For the purposes of this invention, metallocene catalysts are defined as those catalysts claimed on the issue date, in U.S. Pat. No. 5,498,581, which is entitled "Method for Making and Using a Supported Metallocent Catalyst System" and which issued on Mar. 12, 1996. The entire disclosure of U.S. Pat. No. 5,498,581, is hereby incorporated by reference. A suitable, and preferred, metallocene catalyst is ((9-fluorenyl) (cyclopentadienyl) (methyl) (3-butenyl) methane) zirconium dichloride.

The polymer has a density from about 0.90 to about 0.95 grams per cubic centimeter. However, it is preferable when the density is from about 0.91 to about 0.93, and it is most preferable when the density is from 0.915 to 0.925 grams per cubic centimeter. This density is measured in accordance with ASTM D 1505.

The polymer has a melt index from about 0.1 to about 5 grams per ten minutes. However, it is preferable when the melt index is from about 0.3 to about 3, and it is most preferable when the melt index is from 0.5 to 2.5 grams per ten minutes. This melt index is measured in accordance with ASTM D 1238, condition F.

The polymer has a heterogeneity index from about 2 to about 3. However, it is preferable when the heterogeneity index is from about 2.1 to about 2.7, and it is most preferable when the heterogeneity index is from 2.2 to 2.5. This heterogeneity index is measured using gel permeation chromatography.

The reactive component can be any suitable crosslinking agent that crosslinks such polymers. However, it is preferred if the crosslinking agent is an organic peroxide crosslinking agent. For example, diperoxy compounds can be employed as the crosslinking agents. Examples of diperoxy compounds suitable for use as crosslinking agents include acetylenic diperoxy compounds such as hexynes having the formula

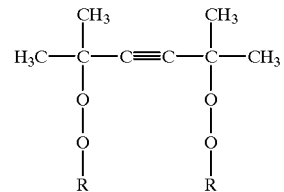

octynes having the formula

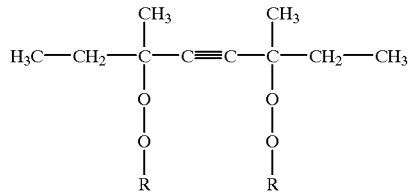

and octadiynes having the formula

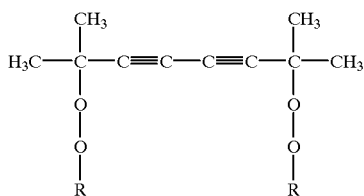

wherein R is selected from the group consisting of tertiary alkyl, alkyl carbonate, and benzoate. The molecular weights of the compounds are generally in the range of from about 200 to about 600. Examples of acetylenic diperoxy compounds described above include:
2,7-dimethyl-1,7-di(t-butylperoxy)octadiyne-3,5;
2,7-dimethyl-2,7-di(peroxy ethyl carbonate)octadiyne-3,5;
3,6-dimethyl-2,6-di(peroxy ethyl carbonate)octyne-4;
3,6-dimethyl-2,6-di(t-butylperoxy)octyne-4;
2,5-dimethyl-2,5-di(peroxybenzoate)hexyne-3;
2,5-dimethyl-2,5-di(peroxy-n-propyl carbonate)hexyne-3;
2,5-dimethyl-2,5-di(peroxy isobutyl carbonate)hexyne-3;
2,5-dimethyl-2,5-di(alpha-cumyl peroxy)hexyne-3;
2,5-dimethyl-2,5-di(peroxy ethyl carbonate)hexyne-3;
2,5-dimethyl-2,5-di(peroxy beta-chioroethyl carbonate) hexyne-3; and
2,5-dimethyl-2,5-di(t-butylperoxy)hexyne-3.

Other diperoxy compounds suitable for use as the crosslinking agent of the composition of the present invention include hexanes having the formula

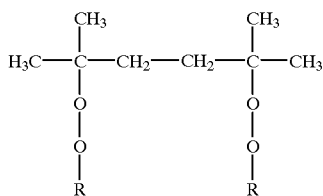

and octanes having the formula

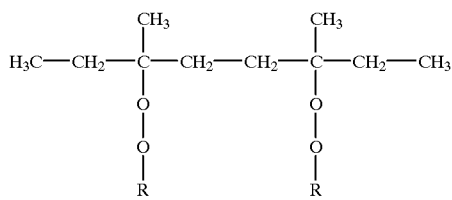

wherein R is selected from the group consisting of tertiary alkyl, alkyl carbonate, and benzoate. The molecular weights of the compounds are generally in the range of from about 200 to a bout 600. Examples of diperoxy compounds described above include:
3,6-dimethyl-2,6-di(t-butylperoxy)octane;
3,6-dimethyl-2,6-di(peroxy ethyl carbonate)octane;
2,5-dimethyl-2,5-di(peroxybenzoate)hexane;
2,5-dimethyl-2,5-di(peroxy isobutyl carbonate)hexane; and
2,5-dimethyl-2,5-di(t-butylperoxy)hexane.

Preferably, the diperoxy compound employed as the crosslinking agent of the composition of the present invention is selected from the group consisting of 2,5-dimethyl-2,5-di(t-butylperoxy)hexyne-3 and 2,5-dimethyl-2,5-di(t-butylperoxy)hexane. Other suitable example of crosslinking agents are disclosed in U.S. Pat. Nos. 3,214,422 and 4,440,893 the entire disclosures of which are hereby incorporated by reference.

It should be noted that the amount of "active oxygen" in a crosslinking agent can significantly affect the amount of agent to use. The term "active oxygen" is well known in the art. In general, it means the active (—O—O—) bonds in a molecule. The amount of active oxygen that should be used in this invention is from about 0.1 to about 20 parts per million by weight based on the weight of the polymer. Preferably, the amount of active oxygen that should be used in this invention is from about 1 to about 15 parts per million by weight based on the weight of the polymer. More preferably, the amount of active oxygen that should be used in the invention is from about 2 to about 14 parts per million by weight based on the weight of the polymer and most preferably from 3 to 13 parts per million by weight based on the weight of the polymer.

The polymer component and the reactive component are reacted at a temperature and pressure to crosslink the polymer. It is believed that some of the polymer chains are broken by the reactive component. These broken polymer chains are then coupled with another polymer chain such that a single polymer chain is made. This single polymer chain contains long chain branching due to the formerly broken, now coupled, polymer chain. It is preferred when the reactive component is dispersed or diluted prior to crosslinking in order to make a more uniform crosslinkable composition and to prevent localized/concentrated crosslinking that will produce gels in film.

In general, the temperature should be from about 160° C. to about 300° C., preferably from about 190° C. to about 270° C. and most preferably from 200° C. to 260° C.

In general, the composition has a shear ratio (HLMI/MI) from about 18 to about 40. However, it is preferred when the shear ratio is from about 20 to about 30.

EXAMPLES

These examples are provided to illustrate the invention. They are not meant to limit the reasonable scope of the invention.

The polymer component use in these examples contained a polymer that was produced in accordance with U.S. Pat. No. 5,498,581, using a metallocene catalyst named ((9-fluorenyl)(cyclopentadienyl)(methyl)(3-butenyl)methane) zirconium dichloride. It had a density of about 0.92 grams per cubic centimeter and a heterogeneity index of about 2.3.

The reactive component was Lupersol 101 which contains 2,5-dimethyl-2,5-di-(t-butyl peroxy)hexane, and which had an active oxygen content of 10.03–10.25 weight percent.

The polymer component and the reactive component were blended together to form a mixture. This mixture was then extruded to form the composition. The composition was then used to produce 1 mil gauge film.

The film was made on 4 inch Sano LLDPE blown film line using standard film blowing conditions. The following conditions were used: a 4 inch LLDPE die with an 0.060 inch gap, 60 pounds per hour feed rate (about 115 RPM), 2.5:1 blow-up ratio, and an "in pocket" bubble. The barrel temperature and the die set temperatures were 190° C.

The results are presented in Table One.

These results are unexpected. In particular, the haze actually decreased in value, this is most unexpected considering the fact that it has been concluded that the haze of LDPE (which also has long chain branching) increases as the number of long chain branches in the polymer increases.[1]

[1] Ferdinand C. Stehling, C. Stanley Speed, and Lowell Westerman, Causes of Haze of Low-Density Polyethylene Blown Films, Macromolecules 1981, 14, 698–708.

TABLE 1

| Example # | HLMI[2] | MI[3] | HLMI\MI | R. C.[4] | D. Impact[5] | S. Impact[6] | TD Tear[7] | Haze[8] |
|---|---|---|---|---|---|---|---|---|
| 1 | 32.2 | 1.92 | 16.8 | 0 | 602 | 0.848 | 442 | 14.5 |
| 2 | 26.87 | 1.38 | 19.5 | 60 | 606 | 0.945 | 459 | 11.3 |
| 3 | 22.71 | 0.93 | 24.4 | 115 | 630 | 1.042 | 427 | 11.1 |
| 4 | 18.74 | 0.62 | 30.2 | 180 | 572 | 0.869 | 486 | 13.4 |

[2]This is the High Load Melt Index in grams per 10 minutes. It was determined in accordance with ASTM D 1238 Condition E.
[3]This is the Melt Index in grams per 10 minutes. It was determined in accordance with ASTM D 1238 Condition F.
[4]This is the amount of reactive component used in preparing the composition in part per million, based on the weight of the polymer.
[5]This is the Dart Impact in grams. It was determined in accordance with ASTM D 1709 Method A.
[6]This is the Spencer Impact in Joules. It was determined in accordance with ASTM D 3420.
[7]This is the TD Tear in grams. It was determined in accordance with ASTM D 1922.
[8]This was measured in accordance with ASTM D 1003.

That which is claimed is:

1. A process for producing a product suitable for making blown film having desirable levels of clarity and strength from a starting polymer of ethylene selected from homopolymers and copolymers of one or more alpha-olefins, said starting polymer being prepared by reacting ethylene and optionally one or more alpha-olefin comonomers in the presence of a metallocene catalyst, said starting polymer having a density in the range of 0.90 to 0.95 grams/cc, a melt index in the range of 0.1 to 5 grams/10 minutes, and a heterogeneity index in the range of 2 to 3, and said process comprising admixing such starting polymer with a crosslinking agent under conditions such that a product is obtained that has but which will produce a blown film an increased shear ratio without an increase in haze.

2. A process according to claim 1 wherein the crosslinking agent is a peroxide.

3. A process according to claim 2 wherein the admixing is conducted at a temperature in the range of 160° C. to 300° C.

4. A process according to claim 3 wherein the crosslinking agent is an organic diperoxide having a molecular weight in the range of 200 to 600.

5. A process according to claim 4 wherein the amount of diperoxide employed is in the range of 60 to 180 parts per million based on the weight of the starting polymer.

6. A process according to claim 5 wherein the starting polymer is prepared using a catalyst system prepared from the metallocene (9-fluorenyl)(cyclopentadienyl)(methyl)(3-butene)methane zirconium dichloride.

7. A process according to claim 6 wherein the diperoxide is 2,5-dimethyl-2,5-di(t-butylperoxy)hexane.

8. A process according to claim 7 wherein the starting polymer has a melt index of at least 1.92.

9. A process according to claim 5 wherein the peroxide is 2,5-dimethyl-2,5-di(t-butyl peroxy)hexane.

10. A process according to claim 9 wherein the starting polymer has a melt index of at least 1.92.

11. A process according to claim 2 wherein the peroxide is employed in an amount such that the amount of active oxygen supplied by the peroxide is in the range of about 0.1 to about 20 parts per million per weight based on the weight of the starting polymer.

12. A process according to claim 7 wherein the starting polymer has a melt index in the range of 0.5 to 2.5 grams/10 minutes and a density in the range of 0.91 to 0.93 gram/cc.

13. A process according to claim 9 wherein the starting polymer has a melt index in the range of 0.5 to 2.5 grams/10 minutes and a density in the range of 0.91 to 0.93 gram/cc.

14. A process for producing a blown film comprising combining a starting polymer having a density in the range of 0.90 to 0.95 gram/cc, a melt index in the range of 0.1 to 5 grams/10 minutes, and a heterogeneity index in the range of 2 to 3, produced by reacting ethylene and optionally 1 or more alpha-olefin comonomers in the presence of a metallocene catalyst, with a crosslinking agent in an amount which will result in a polymer having increased shear ratio without causing an increase in haze, extruding the resulting composition and producing a blown film from the extruded composition.

* * * * *